US010766913B2

(12) United States Patent
Knott et al.

(10) Patent No.: US 10,766,913 B2
(45) Date of Patent: *Sep. 8, 2020

(54) MIXTURES OF CYCLIC BRANCHED SILOXANES OF THE D/T TYPE AND CONVERSION PRODUCTS THEREOF

(71) Applicant: Evonik Degussa GmbH, Essen (DE)

(72) Inventors: Wilfried Knott, Essen (DE); Horst Dudzik, Essen (DE)

(73) Assignee: Evonik Operations GmbH, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,573

(22) Filed: Sep. 25, 2018

(65) Prior Publication Data

US 2019/0106441 A1 Apr. 11, 2019

(30) Foreign Application Priority Data

Oct. 9, 2017 (EP) .................................. 17195510

(51) Int. Cl.

| C07F 7/08 | (2006.01) |
|---|---|
| C08G 18/38 | (2006.01) |
| C08G 77/12 | (2006.01) |
| C08G 77/10 | (2006.01) |
| C08L 83/04 | (2006.01) |
| C08G 77/06 | (2006.01) |
| C08G 77/00 | (2006.01) |

(52) U.S. Cl.
CPC .......... *C07F 7/0838* (2013.01); *C07F 7/0878* (2013.01); *C08G 18/3893* (2013.01); *C08G 77/06* (2013.01); *C08G 77/10* (2013.01); *C08G 77/12* (2013.01); *C08L 83/04* (2013.01); *C08G 77/70* (2013.01)

(58) Field of Classification Search
None
See application file for complete search history.

(56) References Cited

U.S. PATENT DOCUMENTS

| 5,093,101 A | 3/1992 | Knott et al. |
|---|---|---|
| 5,198,207 A | 3/1993 | Knott et al. |
| 5,221,499 A | 6/1993 | Klein et al. |
| 5,371,161 A | 12/1994 | Knott |
| 5,430,166 A | 7/1995 | Klein et al. |
| 5,430,167 A | 7/1995 | Klein et al. |
| 5,455,367 A | 10/1995 | Klein et al. |
| 5,475,127 A | 12/1995 | Klein et al. |
| 5,565,183 A | 10/1996 | Knott |
| 5,670,129 A | 9/1997 | Klapdor et al. |
| 5,831,103 A | 11/1998 | Knott |
| 5,856,548 A | 1/1999 | Drose et al. |
| 5,934,579 A | 8/1999 | Hiersche et al. |
| 5,951,739 A | 9/1999 | Klapdor et al. |
| 5,972,285 A | 10/1999 | Knott |
| 5,981,812 A | 11/1999 | Eufinger et al. |
| 6,197,089 B1 | 3/2001 | Frommeyer et al. |
| 6,255,511 B1 | 7/2001 | Klein et al. |
| 6,291,622 B1 | 9/2001 | Drose et al. |
| 6,307,082 B1 | 10/2001 | Klein et al. |
| 6,387,154 B1 | 5/2002 | Frommeyer et al. |
| 6,444,007 B1 | 9/2002 | Knott et al. |
| 6,489,498 B2 | 12/2002 | Klein et al. |
| 6,521,771 B2 | 2/2003 | Frommeyer et al. |
| 6,659,162 B2 | 12/2003 | Frommeyer et al. |
| 6,854,506 B2 | 2/2005 | Knott et al. |
| 6,858,663 B2 | 2/2005 | Knott et al. |
| 6,874,562 B2 | 4/2005 | Knott et al. |
| 6,915,834 B2 | 7/2005 | Knott et al. |
| 6,942,716 B2 | 9/2005 | Knott et al. |
| 7,018,458 B2 | 3/2006 | Knott et al. |
| 7,125,585 B2 | 10/2006 | Dudzik et al. |
| 7,157,541 B2 | 1/2007 | Knott et al. |
| 7,196,153 B2 | 3/2007 | Burtkhart et al. |
| 7,598,334 B2 | 10/2009 | Ferenz et al. |
| 7,612,158 B2 | 11/2009 | Burkhart et al. |
| 7,612,159 B2 | 11/2009 | Burkhart et al. |
| 7,619,035 B2 | 11/2009 | Henning et al. |
| 7,645,848 B2 | 1/2010 | Knott et al. |
| 7,754,778 B2 | 7/2010 | Knott et al. |
| 7,825,205 B2 | 11/2010 | Knott et al. |
| 7,825,206 B2 | 11/2010 | Neumann et al. |
| 7,825,209 B2 | 11/2010 | Knott et al. |
| 8,138,294 B2 | 3/2012 | Henning et al. |

(Continued)

FOREIGN PATENT DOCUMENTS

| EP | 0514737 A1 | 11/1992 |
|---|---|---|
| EP | 0685425 A1 | 12/1995 |
| EP | 1350804 A1 | 10/2003 |
| EP | 3321304 A1 | 2/2017 |
| WO | 02060621 A2 | 8/2002 |
| WO | 13010747 A1 | 1/2013 |
| WO | 17080747 A1 | 5/2017 |
| WO | 17089068 A1 | 6/2017 |
| WO | 17174272 A1 | 12/2017 |
| WO | 18015152 A1 | 1/2018 |

OTHER PUBLICATIONS

Nam et al., "Condensation reaction of 3-(methacryloxypropyl)-trimethoxysilane and diisobutylsilanediol in non-hydrolytic sol-gel process," copyright 2006, J. Sol-Gel Sci. Techn., vol. 39, pp. 255-260 (7 pages).

*Primary Examiner* — Clinton A Brooks

(74) *Attorney, Agent, or Firm* — Nexsen Pruet PLLC; Philip P. McCann

(57) ABSTRACT

Mixtures of cyclic branched siloxanes having exclusively D and T units, with the proviso that the cumulative proportion of the D and T units having Si-alkoxy and/or SiOH groups that are present in the siloxane matrix, determinable by $^{29}Si$ NMR spectroscopy, is less than 2.0 and preferably less than 1.0 mole percent, are described, as are branched organomodified siloxanes obtainable therefrom.

20 Claims, No Drawings

(56) References Cited

U.S. PATENT DOCUMENTS

| | | |
|---|---|---|
| 8,247,525 B2 | 8/2012 | Schubert et al. |
| 8,268,939 B2 | 9/2012 | Ebbrecht et al. |
| 8,283,422 B2 | 10/2012 | Schubert et al. |
| 8,309,664 B2 | 11/2012 | Knott et al. |
| 8,309,673 B2 | 11/2012 | Schubert et al. |
| 8,324,325 B2 | 12/2012 | Knott et al. |
| 8,334,355 B2 | 12/2012 | Henning et al. |
| 8,349,907 B2 | 1/2013 | Henning et al. |
| 8,420,748 B2 | 4/2013 | Henning et al. |
| 8,450,514 B2 | 5/2013 | Schubert et al. |
| 8,455,603 B2 | 6/2013 | Ferenz et al. |
| 8,557,944 B2 | 10/2013 | Henning et al. |
| 8,598,295 B2 | 12/2013 | Henning et al. |
| 8,609,798 B2 | 12/2013 | Knott et al. |
| 8,722,834 B2 | 5/2014 | Knott et al. |
| 8,722,836 B2 | 5/2014 | Knott et al. |
| 8,729,207 B2 | 5/2014 | Hartung et al. |
| 8,772,423 B2 | 7/2014 | de Gans et al. |
| 8,779,079 B2 | 7/2014 | Henning et al. |
| 8,802,744 B2 | 8/2014 | Knott et al. |
| 8,841,400 B2 | 9/2014 | Henning et al. |
| 8,921,437 B2 | 12/2014 | Knott et al. |
| 8,946,369 B2 | 2/2015 | Henning et al. |
| 8,957,009 B2 | 2/2015 | Schubert et al. |
| 8,969,502 B2 | 3/2015 | Knott et al. |
| 8,974,627 B2 | 3/2015 | Schubert et al. |
| 8,993,706 B2 | 3/2015 | Schubert et al. |
| 9,035,011 B2 | 5/2015 | Ferenz et al. |
| 9,068,044 B2 | 6/2015 | Schubert et al. |
| 9,315,614 B2 | 4/2016 | Schubert et al. |
| 9,334,354 B2 | 5/2016 | Ferenz et al. |
| 9,353,225 B2 | 5/2016 | Knott et al. |
| 9,441,145 B2 | 9/2016 | Schubert et al. |
| 9,481,695 B2 | 11/2016 | Knott et al. |
| 9,695,202 B2 | 7/2017 | Henning et al. |
| 9,783,635 B2 | 10/2017 | Schubert et al. |
| 9,896,541 B2 | 2/2018 | Fiedel et al. |
| 9,975,909 B2 | 5/2018 | Schubert et al. |
| 2002/0161158 A1 | 10/2002 | Burkhart et al. |
| 2007/0128143 A1 | 6/2007 | Gruning et al. |
| 2009/0137752 A1 | 5/2009 | Knott et al. |
| 2010/0022435 A1 | 1/2010 | Henning et al. |
| 2010/0081781 A1 | 4/2010 | Schubert et al. |
| 2011/0230619 A1 | 9/2011 | Kuppert et al. |
| 2011/0301254 A1 | 12/2011 | Knott et al. |
| 2012/0068110 A1 | 3/2012 | Schubert et al. |
| 2012/0282210 A1 | 11/2012 | Henning et al. |
| 2013/0041115 A1 | 2/2013 | Knott et al. |
| 2013/0213267 A1 | 8/2013 | Fiedel et al. |
| 2013/0345318 A1 | 12/2013 | Schubert et al. |
| 2014/0256844 A1 | 9/2014 | Henning et al. |
| 2014/0309446 A1 | 10/2014 | Anajjahe et al. |
| 2015/0004112 A1 | 1/2015 | Ritter et al. |
| 2015/0004113 A1 | 1/2015 | Ritter et al. |
| 2016/0130290 A1 | 5/2016 | Knott et al. |
| 2016/0130402 A1 | 5/2016 | Schubert et al. |
| 2016/0160009 A1 | 6/2016 | Ferenz et al. |
| 2017/0081469 A1 | 3/2017 | Fiedel et al. |
| 2017/0198099 A1 | 7/2017 | Knott |
| 2017/0226285 A1 | 8/2017 | Lobert et al. |
| 2018/0016392 A1 | 1/2018 | Lobert et al. |
| 2018/0134850 A1 | 5/2018 | Knott et al. |
| 2018/0258228 A1 | 9/2018 | Amajjahe et al. |

MIXTURES OF CYCLIC BRANCHED SILOXANES OF THE D/T TYPE AND CONVERSION PRODUCTS THEREOF

The invention relates to a process for preparing mixtures of cyclic branched siloxanes of the D/T type, to the mixtures of cyclic branched siloxanes of the D/T type themselves, and to the methods of processing these siloxanes to give functionalized branched siloxanes and/or branched silicone oils.

BACKGROUND

Cited as a reference in relation to the M, D, T, Q nomenclature used in the context of this document to describe the structural units of organopolysiloxanes is W. Noll, Chemie and Technologie der Silicone [Chemistry and Technology of the Silicones], Verlag Chemie GmbH, Weinheim (1960), page 2 ff.

SUMMARY

In the preparation of organomodified siloxanes, especially branched function-bearing siloxanes, a difficulty frequently encountered is that competing processes that take place simultaneously in the reaction matrix can adversely affect the quality of the desired product.

DETAILED DESCRIPTION

Condensation and equilibration are among these competing processes, which have to be considered separately according to the synthetic problem. A great challenge is the homogeneous distribution of branching sites along a siloxane chain (avoidance of T-structured domains). As can be inferred from the literature, the breakup of homologous siloxane chains consisting of T units under acid catalysis in particular is difficult and hence in effect cannot be accomplished in the presence of sensitive functional groups. With regard to the reactivity characteristics of M, D and T units, reference is made to M. A. Brook, "Silicon in Organic, Organometallic and Polymer Chemistry", John Wiley & Sons, Inc., New York (2000), p. 264 ff.

Especially in the preparation of branched siloxanes bearing reactive SiH groups, considerable efforts should therefore always be made to reconcile the demand for uniform distribution of siloxane units as far as possible in a statistical manner with the demand for very substantial retention of the valuable silicon-bonded hydrogen.

Polyorganosiloxanes are prepared according to the prior art by hydrolysis and condensation proceeding from methylchlorohydrosilanes having mixed substitution. Direct hydrolytic condensation of hydrogen-containing silanes, for example dimethylmonochlorosilane or methyldichlorosilane, is described, for example, in U.S. Pat. No. 2,758,124. In this case, the siloxane phase that separates in the hydrolysis is separated from the water phase having a hydrochloric acid content. Since this process is prone to gelation of the hydrosiloxanes, DE 1125180 describes an improved process utilizing an organic auxiliary phase, in which the hydrosiloxane formed is present as a separate phase dissolved in an organic solvent and, after separation from the acidic water phase and distillative removal of the solvent, is resistant to gelation. A further process improvement with regard to minimized solvent input is described by EP0967236, the teaching of which involves first using only small amounts of water in the hydrolytic condensation of the organochlorosilanes, such that hydrogen chloride is driven out in gaseous form in the first step and can be sent directly to further end uses as a material of value.

Branched organomodified polysiloxanes can be described by a multitude of structures. In general, a distinction has to be made between a branch or crosslink which is introduced via the organic substituents and a branch or crosslink within the silicone chain. Organic crosslinkers for linkage of siloxane skeletons bearing SiH groups are, for example, α,ω-unsaturated diolefins, divinyl compounds or diallyl compounds, as described, for example, in U.S. Pat. No. 6,730,749 or EP 0381318. This crosslinking by platinum-catalysed hydrosilylation downstream of the equilibration means an additional process step in which both intramolecular linkages and intermolecular linkages can take place. The product properties are additionally greatly affected by the different reactivities of the low molecular weight organic difunctional compounds that have a tendency to peroxide formation.

Multiple crosslinking of the silicone block of an organomodified polysiloxane with the organic block copolymer can be effected in various ways. EP 0 675151 describes the preparation of a polyethersiloxane by hydrosilylation of a hydrosiloxane with a deficiency of hydroxy-functional allyl polyether, in which unconverted SiH functions are joined to the hydroxyl groups of the polyether substituents via an SiOC bond with addition of sodium methoxide. The increase in molar mass leads to broad scatter in the product properties, for example the viscosity. A similar approach to the formation of branched systems is described by U.S. Pat. No. 4,631,208, in which hydroxy-functional polyethersiloxanes are crosslinked by means of trialkoxysilanes. Both methods lead to intermolecular crosslinking of the polyethersiloxanes where it is not only difficult to control the increase in molar mass but where there are also associated unpredictable rises in viscosity. Following the aforementioned methods, what is obtained is not branching within the siloxane portion at constant molar mass, but crosslinking to give macromolecular multiblock copolymers.

Branching within the siloxane chain therefore already has to be effected in the course of production of the hydrosiloxane, in order to get round the described disadvantages of the crosslinking. Branches within the siloxane chain require the synthetic incorporation of trifunctional silanes, for example trichlorosilanes or trialkoxysilanes.

As known to the person skilled in the art, the rate of hydrolysis of the organochlorosilanes rises in the following series (C. Eaborn, Organosilicon Compounds, Butterworths Scientific Publications, London 1960, p. 179):

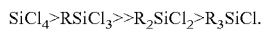

$SiCl_4 > RSiCl_3 >> R_2SiCl_2 > R_3SiCl$.

Therefore, in the hydrolysis and condensation reactions of trichlorosilanes, there is an elevated tendency to formation of highly crosslinked gels compared to the slower hydrolysis and condensation reactions of difunctional and monofunctional organochlorosilanes. The established processes for hydrolysis and condensation of dichloro- and monochlorosilanes are therefore not directly applicable to trichlorosilanes; instead, it is necessary to take indirect routes via multistage processes.

Building on this finding, it is also necessary to conduct the preparation of singly branched hydrosiloxanes by incorporation of not more than one trifunctional monomer per siloxane chain in a two-stage process according to the prior art. In a first step, a trifunctional low molecular weight hydrosiloxane is prepared by hydrolysis and condensation from 1,1,3,3-tetramethyldisiloxane and methyltriethoxysilane, as taught, for example, by DE 3716372. Only in a second step is equilibration then possible with cyclic siloxanes to give higher molar masses, as explained by DE 102005004676. For further conversion—and therefore only in a third step—the singly branched hydrosiloxane thus prepared can be provided by the methods known per se for functionalization of siloxane compounds having SiH groups with organic substituents.

For synthesis of multiply branched hydrosiloxanes which, by definition, have more than one trifunctional monomer per siloxane chain, there are likewise two-stage syntheses in the prior art. In principle, it is possible to proceed from hydrosiloxanes and to subject the SiH functions, with addition of water and precious metal catalyst, to dehydrogenative conversion to silanols which are then condensed in turn with hydrosiloxanes. This procedure is described in U.S. Pat. No. 6,790,451 and in EP 1717260. Quite apart from the costs of the precious metal catalysis, the poor storage stability of the silanols, which have a tendency to autocondensation, makes it difficult to accomplish a reproducible, controlled process regime.

A further option described in U.S. Pat. No. 6,790,451 is that of preparing a copolymer from trichloromethylsilane or trialkoxymethylsilane with hexamethyldisiloxane or trimethylchlorosilane, also called MT polymer therein, which is equilibrated in a second step together with a polydimethyl(methylhydro)siloxane copolymer. The preparation of such MT polymers entails the use of strong bases or strong acids, in some cases in combination with high reaction temperatures, and results in prepolymers of such high viscosity that the neutralization thereof is made considerably more difficult and hence further processing to give end products of constant composition and quality is significantly limited.

According to EP 0675151, first of all, the hydrolysis and condensation of the SiH-free branched silicone polymer is conducted in xylene in such a way that the final occlusion of the precondensate is conducted with a large excess of hexamethyldisiloxane and, in the second step, the equilibration is undertaken with methylhydropolysiloxane to give a branched hydrosiloxane (preparation method 6, ibid.). As an alternative, the teaching of EP 0675151 relates to a procedure for preparation of non-SiH-functional branched siloxanes including merely a partial condensation of the methyltrichlorosilane used (preparation method 7, ibid.). However, these two procedural strategies do not address the need for a universally utilizable preparation method for branched siloxanes.

WO2009065644 A1 teaches a process for preparing branched SiH-functional siloxanes by reacting a mixture comprising
  a) one or more SiH-functional siloxanes, b) one or more SiH function-free siloxanes and c) one or more trialkoxysilanes with addition of water and in the presence of at least one Bronsted-acidic catalyst, wherein the reaction is conducted in one process step. The technical limits of this process become clear from the disclosure therein with regard to the conservation of the SiH functionality introduced into the system. This shows the need to work with at least two acidic catalysts (trifluoromethanesulfonic acid vs. trifluoromethanesulfonic acid and sulfonic acid ion exchange resin, ibid. examples 5 and 6) for sensitive SiH-functional branched siloxane structures, which makes the process extremely inconvenient and costly in terms of its industrial implementation.

There has already been speculation in the literature about the possible existence of siloxanes formed exclusively from D and T units. As stated by W. Noll in Chemie and Technologie der Silicone, Weinheim (1960), page 182, D. W. Scott (J. Am. Chem. Soc. 68, 356, 1946) was the first to suggest that bicyclic compounds of siloxanes having D and T units derive from an extremely dilute co-hydrolysis of dimethyldichlorosilane and methyltrichlorosilane with subsequent thermal rearrangement. It was possible to isolate isomers in amounts of not even 1% from the viscous co-hydrolysate at bottom temperatures between 350 and 600° C., and they were then described by cryoscopic and elemental analysis with very high levels of uncertainty. Scott speculates that his compounds having D-T structures contain T structural elements joined directly to one another and not via D units. The interpretation of the results in Scott is based on the premise that all the SiC bonds present in the co-hydrolysate withstand the severe thermal treatment that he chose.

Makarova et al. (Polyhedron Vol. 2, No. 4, 257-260 (1983)) prepared 10 oligomeric methylsiloxanes having cyclic and linear segments by the controlled low-temperature condensation of siloxanes having SiOH groups and containing SiCl groups in the presence of organic amines such as triethylamine or aniline in benzene or diethyl ether as solvents, separated off the precipitated amine hydrochlorides, and washed and then fractionally distilled the crude reaction products. Subsequently, the bicyclic methylsiloxanes were subjected to pyrolysis at temperatures between 400 and 600° C., and the pyrolysis products were characterized by gas chromatography. The low molecular weight compounds used in the course of this study, for example hydroxynonamethylcyclopentasiloxane, hydroxyheptamethylcyclotetrasiloxane, dihydroxytetramethyldisiloxane, from the point of view of the silicone chemistry conducted on the industrial scale, are to be considered as exotic species of purely academic interest.

More particularly, the pure-chain siloxane compounds of the D/T type defined in terms of molar mass that have been synthesized by this route are unsuitable for the production of organomodified siloxanes that are employed in demanding industrial applications, for example in PU foam stabilization or in the defoaming of fuels, etc. Active ingredients that effectively address such a field of use are always characterized by a broad oligomer distribution comprising high, moderate and low molar masses, since the oligomers present therein, depending on their molar mass and hence their diffusion characteristics, can very commonly be imputed to have differentiated surfactant tasks in different time windows of the respective process. Specifically in the case of the branched organomodified siloxanes, due to the reaction characteristics of M, D and T units that have been discussed at the outset, however, a good oligomer distribution combined with a uniform distribution of siloxane units in a statistical manner as far as possible in the individual molecules can only be achieved when the starting material of the D/T type used already itself conforms to a distribution function. This is all the more true when the organomodification is effected via an intermediate bearing SiH groups.

Acknowledging this prior art, there is no apparent real solution for preparation of branched organomodified siloxanes.

The as yet unpublished European patent application number 17156421.4 is geared to a preparation process for obtaining branched organomodified siloxanes, which comprises (a) in a first step preparing cyclic branched siloxanes of the D/T type by the reaction of trialkoxysilane exclusively with siloxane cycles and/or □□□-dihydroxypolydimethylsiloxane in a solvent and (b) in a second step undertaking the functionalization of these cyclic branched siloxanes by acidic equilibration with functional silanes and/or siloxanes. The mixtures of cyclic branched siloxanes having exclusively D and T units and having no functional groups that arise from the first step, according to that document, are characterized in that the cumulative proportion of the D and T units having Si-alkoxy and SiOH groups that are present in the siloxane matrix, determinable by $^{29}$Si NMR spectroscopy, is less than or equal to 2 mole percent, and so no significant proportions of the Si-alkoxy or SiOH groups that originate from the first stage are carried through into the second step and molecularly conserved. For this purpose, according to that document, in the first step, silicon-free solvents including liquid (alkyl)aromatics, for example toluene, the isomeric xylenes, cycloaliphatics, for example cyclohexane, but also diethyl carbonate, are used, more preferably toluene. The process disclosed in patent application Ser. No. 17/156,421.4 opens up access in a simple manner, via the intermediate stage of the DT siloxanes, to function-bearing branched siloxanes or else to branched silicone oils. Under the aspect of technical interpretation, in that process, however, the necessity of the use of solvent such as toluene in particular can possibly be regarded as a drawback, since, in the environment of a production operation preparing specifically organomodified siloxanes, the organic auxiliary phase is always a more or less disagreeable extraneous phase, for example with regard to the removal, purification and recycling thereof into the overall process. Assurance of non-cross-contaminated streams of matter, in addition to aspects of safe storage, handling and disposal, is of particular significance.

Using these features as a starting point, the focus of the as yet unpublished European patent application with file reference 17169876.4 is a process for producing mixtures of cyclic branched siloxanes having exclusively D and T units using silicon-containing solvent, preferably simple siloxane cycles.

This process comprises an acid-catalysed equilibration of trialkoxysilanes with siloxane cycles and/or □□□□□dihydroxypolydimethylsiloxane in the presence of at least one acidic catalyst and, thereafter, a hydrolysis and condensation reaction initiated by addition of water with subsequent use of a silicon-containing solvent, followed by a distillative removal of the alcohol released, water present in the system and silicon-containing solvent, and by a neutralization or removal of the acidic catalyst and, if appropriate, removal of any salts formed.

Compared to the degree of hydrolysis and condensation achievable in the process of the likewise as yet unpublished patent application under file reference 17156421.4, the focus of which is the use of non-silicon-containing solvents, the cumulative proportion of the D and T units that are present in the siloxane matrix and have Si-alkoxy or SiOH groups, determinable by $^{29}$Si NMR spectroscopy, however, is greater than 2 and less than 10 mole percent, meaning that the degree of condensation is much lower.

A consequence of this is that a distinctly elevated level of technical complexity necessary to process cyclic branched siloxanes of the D/T type prepared in this way to give functionalized branched siloxanes and/or branched silicone oils derives therefrom. Default solutions are the elevated amount of costly equilibrating acid, or the application of an auxiliary vacuum and/or the sequenced addition of the equilibrating acid, in order to enable further processing of the DT siloxanes characterized by elevated Si-alkoxy or Si—OH concentration as systems of a low degree of condensation.

On the other hand, the advantage of the as yet unpublished European patent application with reference number 17169876.4 is that the solvent mixtures obtained in the course of the production of cyclic branched DT siloxanes are simpler in nature than those obtained after the process of the likewise as yet unpublished patent application under reference number 17156421.4. Following the latter teaching, one is confronted, for example, with solvent systems consisting of toluene/ethanol/water or else of ethanol/toluene, whereas the process conducted in silicon-containing solvents requires, for example, merely the thermal removal of ethanol/water mixture.

The complexity involved in the recovery of the toluene is considerable and reduces the attractiveness of the otherwise very productive chemical process.

The recycling aspect of the solvents used and/or obtained in chemical processes is becoming increasingly important in the context of economic viability, but also of the general discussion of sustainability which is becoming ever more urgent.

Surprisingly, a process has now been found for production of mixtures of cyclic branched siloxanes having exclusively D and T units, which is advantageous both in the context of the recycling of the solvents obtained, but also for the achievement of a high degree of condensation.

The process according to the invention especially envisages conducting the acid-catalysed equilibration of trialkoxysilanes with siloxane cycles and/or □□□-dihydroxypolydimethylsiloxane, with subsequent addition of water and simple siloxane cycles that function as solvent and subsequent distillative removal of an alcohol/water mixture, and then, after addition of toluene, by distillative removal of a toluene/water mixture, driving the equilibrating incorporation of the simple siloxane cycles that functioned as solvent beforehand and the hydrolysis and condensation reaction to such an extent that the cumulative proportion of the D and T units having Si-alkoxy and/or SiOH groups that are present in the siloxane matrix, determinable by $^{29}$Si NMR spectroscopy, is not more than than 2 mole percent.

According to the invention, the combined, successive use of silicon-containing and silicon-free solvents is found to be particularly advantageous since it allows the removal of an alcohol/water mixture which is easy to dispose of and the clean removal of the toluene process solvent, since the toluene/water mixture removed by distillation separates in a fully density-separated manner in condensed phase. This does justice to the important idea of recycling, since the very pure toluene separated out (in this regard, see the gas chromatography analysis of Inventive Example 1), if required, can easily be sent back into the process.

Furthermore, the mixtures of cyclic branched siloxanes of the D/T type produced by the process according to the invention, which have a proportion of Si-alkoxy or SiOH determined by spectroscopy of not more than 2 mole percent based on the totality of silicon detected by spectroscopy, permit processing to give the corresponding functionalized branched siloxanes and/or branched silicone oils under acid-catalysed equilibration without adjustment of customary standard equilibration conditions (such as preferably: 0.1% by weight of added trifluoromethanesulfonic acid, 40° C.≤reaction temperature≤60° C., reaction time 6 hours), which incidentally corresponds to a preferred embodiment of the process according to the invention.

Thus, the present invention combines both the advantage of making cyclic branched siloxane mixtures of the D/T type available with a high degree of condensation and hence easy further processibility and the advantage, from the point of view of sustainability, of giving rise to only a small amount of wastes that are additionally easy to dispose of.

A particular additional advantage of the invention is that the mixtures according to the invention additionally feature excellent storage stability, even in the case of storage under air and at high temperatures. Solidification or even through-curing does not occur, even after storage under air at elevated temperatures for a number of months.

This gives rise to the following items of subject-matter of the invention.

The invention provides mixtures of cyclic branched siloxanes having exclusively D and T units, with the proviso that the cumulative proportion of the D and T units having Si-alkoxy and/or SiOH groups that are present in the siloxane matrix, determinable by $^{29}$Si NMR spectroscopy, is less than 2 mole percent, preferably less than 1 mole percent, and further comprising at least 5% by weight of siloxane cycles, such as preferably octamethylcyclotetrasiloxane ($D_4$), decamethylcyclopentasiloxane ($D_5$), dodecamethylcyclohexasiloxane ($D_6$) and/or mixtures thereof. The siloxanes prepared in accordance with the invention do not have any further functional groups.

The invention further provides a process for preparing mixtures of cyclic branched siloxanes having exclusively D and T units, preferably according to any of claims 1-5, comprising (a) an acid-catalysed equilibration of trialkoxysilanes with siloxane cycles and/or ☐☐☐☐☐☐☐☐-dihydroxypolydimethylsiloxane in the presence of at least one acidic catalyst and then (b) a hydrolysis and condensation reaction initiated by addition of water, followed by the addition of a silicon-containing solvent, (c) with a subsequent distillative removal of the alcohol released and proportions of the water present in the system, (d) with subsequent addition of toluene and separation of residual water remaining in the system, (e) followed by a neutralization or removal of the acidic catalyst and, if appropriate, removal of any salts formed, (f) with final distillative removal of toluene still present in the system, wherein the silicon-containing solvent preferably comprises the isomeric siloxane cycles octamethylcyclotetrasiloxane ($D_4$), decamethylcyclopentasiloxane ($D_5$) and/or mixtures thereof, and mass ratios of silicon-containing solvent to the siloxane having D and T units of 1:1 to 5:1 are advantageously employed.

This process especially enables the provision of the mixtures according to claim 1.

The invention still further provides a process for producing branched organomodified siloxanes, wherein cyclic branched siloxanes are provided in a first step, preferably mixtures of cyclic branched siloxanes having exclusively D and T units, with the proviso that the cumulative proportion of the D and T units having Si-alkoxy and/or SiOH groups that are present in the siloxane matrix, determinable by $^{29}$Si NMR spectroscopy, is less than 2 mole percent, preferably less than 1.0 mole percent, and further comprising at least 5% by weight of siloxane cycles, such as preferably octamethylcyclotetrasiloxane ($D_4$), decamethylcyclopentasiloxane ($D_5$) and/or mixtures thereof, and wherein, in a second step, the cyclic branched siloxanes are equilibrated under acidic conditions with silanes and/or siloxanes.

The invention and its subject matter are more particularly elucidated hereinafter.

In the inventive mixtures of cyclic branched siloxanes having exclusively D and T units as defined in the main claim, in the context of a preferred embodiment of the invention, the ratio of D to T units is between 10:1 and 3:1, preferably between 6:1 and 4:1.

In a further preferred embodiment of the invention, the molar mass ratio $M_w/M_n$ of the mixture of cyclic branched siloxanes having exclusively D and T units is in the range of $2<M_w/M_n<50$. These parameters can be determined from toluenic solutions of the siloxanes by gel permeation chromatography (GPC), which, with utilization of a refractive index detector, by comparison with a polystyrene standard, permits the determination of the mean molar mass Mdw thereof and the molar mass distribution $M_w/M_n$ thereof.

When the mixtures of cyclically branched siloxanes having exclusively D and T units, as described above, have the feature that the branching T unit derives from alkyltrialkoxysilanes and/or, preferably or, phenyltrialkoxysilanes, this is a further preferred embodiment of the invention.

A preferred embodiment of the invention is likewise when the branching T unit derives from methyltriethoxysilane.

The provision of the aforementioned mixtures according to the invention is possible via the process already specified, which is also defined in claim 6.

The silicon-containing solvent to be used here preferably comprises the isomeric siloxane cycles octamethylcyclotetrasiloxane ($D_4$), decamethylcyclopentasiloxane ($D_5$) and/or mixtures thereof, and it is advantageous to work in mass ratios of silicon-containing solvent to the siloxane of 1:1 to 5:1. This corresponds to a preferred embodiment of the invention.

In a further preferred embodiment, in the context of the process according to the invention, the acidic catalyst used is para-toluenesulfonic acid, trifluoromethanesulfonic acid, trichloroacetic acid, sulfuric acid, perchloric acid, phosphoric acid and/or hexafluorophosphoric acid, preferably in amounts of 0.1 to 2.0 percent by weight, more preferably in amounts of 0.15 to 1.0 percent by weight, based in each case on the silicon-containing component of the reaction matrix.

In a further preferred embodiment of the invention, the acidic catalyst used is a macrocrosslinked sulfonic acid ion exchange resin, preferably in amounts of 1.0 to 10.0 percent by weight, more preferably in amounts of 2.0 to 6.0 percent by weight, based in each case on the silicon-containing component of the reaction matrix.

If the reaction according to the invention is conducted at temperatures in the range from 20° C. to 120° C., preferably from 40° C. to 110° C., this is a further preferred embodiment of the invention.

It is likewise a further preferred embodiment of the invention when an at least 100% excess of $H_2O$, based on the groups to be condensed, is used.

It is likewise a further preferred embodiment of the invention when the reaction comprises a preliminary equilibration step at temperatures of T>40° C., followed by a condensation initiated by addition of water at temperatures of T>60° C., where the water is added in one portion, in several portions or continuously.

For the process according to the invention, it is possible in principle to use any trialkoxysilanes. Trialkoxysilanes used may especially be those in which the alkoxy radicals are all the same or all different or in which some are the same. Trialkoxysilanes used may especially be triethoxysilanes, preferably methyltriethoxysilane, alkyltriethoxysilanes, for example n-propyltriethoxysilane, isobutyltriethoxysilane, pentyltriethoxysilane, hexyltriethoxysilane, octyltriethoxysilane, hexadecyltriethoxysilane, n-octadecyltriethoxysilane, halogenated or pseudohalogenated alkyltrialkoxysilanes, especially alkyltriethoxysilanes, for example chloropropyltriethoxysilane, tridecafluoro-1,1,2,2-tetrahydrooctyltriethoxysilane, nonafluoro-1,1,2,2-tetrahydrohexyltriethoxysilane, 3-cyanopropyltriethoxysilane, trialkoxysilanes, especially triethoxysilanes having functional groups, for example 3-methacryloyloxypropyltriethoxysilane, 3-mercaptopropyltriethoxysilane, 5-(bicycloheptenyl)triethoxysilane, phenyltriethoxysilane, (p-chloromethyl)phenyltriethoxysilane, N-(3-triethoxysilylpropyl)-4,5-dihydroimidazole or dihydro-3-[3-(triethoxysilyl)propyl]furan-2,5-dione. It may be advantageous for organically functionalized trialkoxysilanes to be used as branching unit (included in the equilibration).

Using the example of the D/T cycles derived from methyltriethoxysilane, a preferred process variant is as described by way of example hereinafter:

Advantageously, the equilibration of methyltriethoxysilane is undertaken exclusively with siloxane cycles and/or □□□dihydroxypolydimethylsiloxane with addition of a catalytic amount of preferably trifluoromethanesulfonic acid at 60° C. over the course of 2 to 4 hours. After this pre-equilibration step, after addition of a preferably at least 100% stoichiometric excess of water, the condensation reaction is then conducted over the course of preferably 2 to 4 hours at preferably 80° C., then another portion of water is preferably added to the system, in order then to add a silicon-containing solvent, preferably simple siloxane cycles ($D_4/D_5$), and to conduct the distillative removal of ethanol/water mixtures until attainment of an internal temperature of 90° C. Toluene is then added to the reaction mixture and the water still present in the system is removed by distillation up to a bottom temperature of 100° C., preferably at the water separator. The reaction mixture is allowed to cool down to about 60° C., the acid is neutralized, for example by addition of solid sodium hydrogencarbonate, and the mixture is then stirred for complete neutralization for a further 30 minutes. After cooling to 25° C., salts are removed by filtration, for example sodium triflate. At 70° C. and with an auxiliary vacuum of <1 mbar applied, the toluene used as solvent is distilled off.

The amount of water that has been introduced here into the system is preferably such that the total amount of water used over all the steps of the process according to the invention covers a stoichiometric excess of 150% to 500%, preferably 150% to 250%, based on methyltriethoxysilane used.

The trifluoromethanesulfonic acid, which is used with preference as equilibration catalyst in the process according to the invention, is preferably used in amounts of 0.1%-0.5% by weight, preferably in amounts of 0.15% to 0.3% by weight, based on the mass of all Si-containing reactants in the equilibration mixture.

A crucial advantage of the preparation process according to the invention is that the synthesis of cyclic branched siloxanes can be conducted under more severe reaction conditions, for example at a high acid concentration and high temperatures, without product damage since there are no sensitive moieties present at all (for example SiH functions). Optimal incorporation of branching units (T structures) into the molecular skeletons of the siloxane oligomers is thus possible, where the T structures are ideally separated by D units in each case and are not present in cumulated form in a domain-like manner, as shown by the $^{29}$Si NMR spectroscopy, especially in the shift region of the T structures.

The silicon-containing solvents usable here with preference in accordance with the invention include the simple liquid dimethylsiloxane cycles such as octamethylcyclotetrasiloxane ($D_4$) and decamethylcyclopentasiloxane ($D_5$), and mixtures thereof. Particular preference is given to decamethylcyclopentasiloxane ($D_5$).

The silicon-containing solvent, especially comprising the simple siloxane cycles mentioned, as already described above, is partly incorporated into the siloxanes having exclusively D and T units after addition of toluene and in the course of the distillative removal of a toluene/water mixture.

The acidic catalyst used in accordance with the invention should be removed prior to the final distillative removal of the toluene still present in the system, either by a neutralization in which any salts formed are to be removed or by a simple removal from the system (for example using macrocrosslinked sulfonic acid ion exchange resins). A multitude of bases are suitable for neutralization.

As shown in Examples 1 and 2, even sodium hydrogencarbonate is an effective base for neutralization of the trifluoromethanesulfonic acid which is present in the system and is used with preference in accordance with the invention.

In principle, it is also possible to use other bases, for example organic amines, for neutralization of the trifluoromethanesulfonic acid present in the system. Especially from the aspect of industrial production, it is also possible to use gaseous ammonia.

After final distillative removal of the toluene still present in the system, it is possible to isolate mixtures of cyclic branched siloxanes in virtually quantitative yields, these being clear colourless liquids of low viscosity, the corresponding $^{29}$Si NMR spectrum of which demonstrates the dominant presence of D and T units. The cumulative contents of D and T units having Si-alkoxy or SiOH groups determined by $^{29}$Si NMR spectroscopy, in the cyclic branched siloxanes of the D/T type obtained by the process according to the invention, are less than 2 mole percent, preferably less than 1.0 mole percent, based on the totality of silicon detected by spectroscopy.

The resulting mixtures usually comprise at least 5% by weight of siloxane cycles, such as preferably octamethylcyclotetrasiloxane ($D_4$), decamethylcyclopentasiloxane ($D_5$) and/or mixtures thereof.

Particular preference is given to a process according to the invention, as described above, in which the mixtures of cyclic branched siloxanes are equilibrated with silanes and/or siloxanes in the presence of an acidic catalyst, preferably trifluoromethanesulfonic acid, preferably in an amount of ≥0.1% by weight.

A further embodiment of the process claimed which is preferred in accordance with the invention arises from the use of a water-containing macroporous sulfonic acid polystyrene resin, for example of a Lewatit® K 2621 wetted with 10% by weight of water, for equilibration.

A process according to the invention as described above in which the mixtures of cyclic branched siloxanes are acid-equilibrated with silanes and/or siloxanes and the equilibration is undertaken over a water-containing macroporous sulfonic acid polystyrene resin, which is preferably used in amounts of 3% to 9% by weight based on the mixture to be equilibrated, and which has preferably been wetted with 8% to 12% by weight of water, and the specific surface area of which is preferably >35 m$^2$/g and the mean pore diameter of which is preferably at least 65 nm, corresponds to a particularly preferred embodiment of the invention.

An example of a particularly preferred sulfonic acid cation exchange resin is Lewatit® K 2621.

To achieve the final siloxane structure, i.e. to provide branched organomodified siloxanes, an acidic equilibration with silanes, preferably functional silanes, and/or siloxanes is conducted.

This corresponds to the process according to the invention for preparing branched organomodified siloxanes, wherein
in a first step mixtures of cyclic branched siloxanes are provided, preferably as described above in detail, especially according to any of claims 1 to 11,
and
in a second step the mixtures of cyclic branched siloxanes are acid-equilibrated with silanes and/or siloxanes.

The silanes and/or siloxanes used may be any acid-equilibratable silicon compounds. Functional silanes and/or siloxanes are preferred.

Functional silane/siloxane are understood in this connection to mean all those compounds comprising one silicon atom and/or multiple silicon atoms which can be incorporated into the copolymer by way of acidic equilibration. More particularly, these acid-equilibratable silanes or siloxanes, as well as any hydrogen, alkyl or aryl, or vinyl substituents present, also have hydroxyl, alkoxy and chlorine substituents. Likewise suitable are functional silanes/siloxanes that bear acidic moieties, for example toluenesulfonate, trifluoromethylsulfonate and sulfate radicals.

The silanes used may especially be diethoxydimethylsilane, trimethylalkoxysilanes and/or dimethyldichlorosilane.

The siloxanes used may especially be tetramethyldisiloxane, □□□-dihydropolydimethylsiloxanes, poly(methylhydro)siloxanes, □□□-dialkoxypolydimethylsiloxanes and/or □□□-divinylpolydimethylsiloxanes.

As a special case, branched silicone oils are obtainable by the acidic co-equilibration of the cyclic branched siloxane of the D/T type obtained in the first step with hexamethyldisiloxane and/or polydimethylsiloxanes.

This corresponds to the process according to the invention for preparing branched silicone oils, wherein in a first step cyclic branched siloxanes are provided, preferably as stipulated in any of claims 1-11,
and in a second step the cyclic branched siloxanes are reacted with polydimethylsiloxanes or hexamethyldisiloxane.

Suitable acidic catalysts are the strong acids (equilibrating acids) known from the prior art for siloxanes, i.e. mineral acids, for example sulfuric acid, but also sulfonic acids, fluoroalkylsulfonic acids, for example trifluoromethanesulfonic acid, acidic aluminas or acidic ion exchange resins, for example the products known by the Amberlite®, Amberlyst® or Dowex® and Lewatit® brand names.

In the process according to the invention, it is possible to use either natural ion exchangers, for example zeolites, montmorillonites, attapulgites, bentonites and other aluminosilicates, or synthetic ion exchangers. The latter are preferably solids (usually in granular form) with a three-dimensional, water-insoluble, high molecular weight matrix based on phenol-formaldehyde resins or copolymers of styrene-divinylbenzene into which numerous "anchor groups" of different acidity have been incorporated.

Acidic ion exchangers used advantageously may include those as described in EP 1439200 B1.

Preference is given to using sulfonic acid catalysts and very particular preference to using trifluoromethanesulfonic acid.

Gas chromatography analysis shows that, typically, simple siloxane cycles such as $D_4$ (octamethylcyclotetrasiloxane), $D_5$ (decamethylcyclopentasiloxane) and $D_6$ (dodecamethylcyclohexasiloxane) are present in the equilibrates only in proportions by weight of less than 10%.

If desired for the respective later application (for example within the scope of the VOC discussion (VOC=volatile organic compounds) or of anti-fogging), these siloxane cycles can be removed by simple distillation and recycled.

It will be immediately apparent to the person skilled in the art that the branched organomodified siloxanes recovered by acidic equilibration from the second step are suitable as starting material for production of stabilizers for PUR foams, for production of defoamers, for production of paint additives, for production of emulsifiers, especially of cosmetic emulsifiers, for production of cosmetic conditioners, for production of deaerating agents, for production of demulsifiers, for production of textile finishes, for production of building protection additives, for production of polymer additives, especially anti-scratch additives, for production of antifouling additives or coatings and for production of anti-icing coatings. This use forms a further part of the subject-matter of the present invention.

Depending on the functionality (e.g. SiH group) incorporated in the second step or SiCl group, for all these aforementioned applications, after selection of appropriate co-reactants, SiC-bonded final products are obtainable via hydrosilylation, or else SiOC-bonded final products are obtainable via dehydrogenative SiOC bond formation or condensation by the known methods of silicone chemistry.

The $^{29}$Si NMR samples, in the context of this invention, are analysed at a measurement frequency of 79.49 MHz in a Bruker Avance III spectrometer equipped with a 287430 sample head with gap width 10 mm, dissolved at 22° C. in CDCl$_3$ and against tetramethylsilane (TMS) as external standard [□($^{29}$Si)=0.0 ppm].

The weight-average molar mass $M_w$ and the molar mass distribution $M_w/M_n$ are determined in the context of this invention using an EcoSEC GPC/SEC instrument from TOSOH Bioscience GmbH by gel permeation chromatography from toluenic solutions of the siloxanes. A Micro SDV 1000/10000 column of length 55.00 cm is used, combined with an EcoSEC RI detector (dual flow refractive index detection). The polystyrene standard covers the molar mass range from 162 g/mol to 2 520 000 g/mol.

EXAMPLES

1) Preparation of a cyclic branched siloxane having a target D/T ratio of 6:1 (inventive)
   In a 500 ml four-neck round-bottom flask with a precision glass stirrer and a reflux condenser on top, 52.2 g (0.293 mol) of methyltriethoxysilane were heated to 60° C. together with 65.3 g (0.176 mol) of decamethylcyclopentasiloxane while stirring, 0.400 g of trifluoromethanesulfonic acid was added and the mixture was equilibrated for 4 hours. Then 15.8 g of water and 4.0 g of ethanol were added and the mixture was heated to reflux temperature for a further 2 hours. 10.6 g of water and 65.3 g (0.176 mol) of decamethylcyclopentasiloxane ($D_5$) were added and the reflux condenser was exchanged for a distillation system, and the constituents that are volatile up to 90° C. were distilled off within the next hour. Gas chromatography analysis (GC) showed that the distillate consists of ethanol/water. 200 ml of toluene were then added to the reaction mixture and the water still present in the system was removed by distillation up to a bottom temperature of 100° C. at the water separator. The reaction mixture was allowed to cool down to about 60° C., the acid was neutralized by addition of 8.0 g of solid sodium hydrogencarbonate, and the mixture was then stirred for complete neutralization for a further 30 minutes. After cooling to 25° C., the salts were removed with the aid of a fluted filter.

At 70° C. and with an auxiliary vacuum of <1 mbar applied, the toluene used as solvent was distilled off. Gas chromatography analysis (GC) demonstrated that the distillate consists of toluene to an extent of more than 98%. The distillation bottoms were a colourless mobile liquid, the $^{29}$Si NMR spectrum of which shows a D/T ratio of 5.6:1 (target: 6.0:1). Based on the sum total of the Si units detected by spectroscopy, the D and T units bearing Si-alkoxy and SiOH groups respectively, have a proportion of 0.44 mole percent. The gas chromatography analysis of the liquid also shows a proportion of about 15 percent by weight of simple siloxane cycles in the form of $D_4$, $D_5$ and $D_6$.

2) Preparation of a cyclic branched siloxane having a target D/T ratio of 6:1 (inventive)

In a 10 l four-neck round-bottom flask with a precision glass stirrer and a reflux condenser on top, 783 g (4.39 mol) of methyltriethoxysilane were heated to 60° C. together with 978.7 g (2.64 mol) of decamethylcyclopentasiloxane while stirring, 2.98 g of trifluoromethanesulfonic acid were added and the mixture was equilibrated for 4 hours. Then 237 g of water and 59.3 g of ethanol were added and the mixture was heated to reflux temperature for a further 2 hours. 159.0 g of water and 978.8 g (2.64 mol) of decamethylcyclopentasiloxane ($D_5$) were added and the reflux condenser was exchanged for a distillation system, and the constituents that are volatile up to 90° C. were distilled off within the next hour. 3000 ml of toluene were then added to the reaction mixture and the water still present in the system was removed by distillation up to a bottom temperature of 100° C. at the water separator. The reaction mixture was allowed to cool down to about 60° C., the acid was neutralized by addition of 60.0 g of solid sodium hydrogencarbonate, and the mixture was then stirred for complete neutralization for a further 30 minutes. After cooling to 25° C., the salts were removed with the aid of a fluted filter.

At 70° C. and with an auxiliary vacuum of <1 mbar applied, the toluene used as solvent was distilled off. The distillation bottoms were a colourless mobile liquid, the $^{29}$Si NMR spectrum of which shows a D/T ratio of 5.2:1 (target: 6.0:1). Based on the sum total of the Si units detected by spectroscopy, the D and T units bearing Si-alkoxy and SiOH groups respectively have a proportion of 0.43 mole percent. The gas chromatography analysis of the liquid also shows a proportion of about 15 percent by weight of simple siloxane cycles in the form of $D_4$, $D_5$ and $D_6$. The GPC has a broad molar mass distribution, characterized by $M_6$=55258 g/mol; $M_n$ 1693 g/mol and $M_w/M_n$=32.63.

3) Preparation of a branched hydrosiloxane having terminal SiH functions from the cyclic branched siloxane from Example 2 with ☐☐☐-dihydropolydimethylsiloxane and decamethylcyclopentasiloxane (inventive)

23.2 g of the product prepared in Example 2, i.e. the cyclically branched siloxane and the simple siloxane cycles, were heated to 40° C. together with 26.7 g of an ☐☐☐-dihydropolydimethylsiloxane (SiH value: 2.90 eq/kg) and 200.1 g of decamethylcyclopentasiloxane with addition of 0.25 g of trifluoromethanesulfonic acid (0.1 m % based on the overall mixture) in a 500 ml four-neck flask with precision glass stirrer and a reflux condenser on top for 6 hours, then 5 g of sodium hydrogencarbonate were added and the mixture was stirred for a further 30 minutes. With the aid of a filter press (Seitz K 300 filter disc), the salt was separated from the equilibrate.

What was obtained was a colourless branched hydrosiloxane having dimethylhydrosiloxy functions in its termini (SiH value: 0.30 eq/kg) and a viscosity of 150 mPas (25° C., Höppler viscometer). The corresponding $^{29}$Si NMR spectrum confirms the target structure.

4) Preparation of a branched siloxane having terminal vinyl functions (inventive)

97.6 g of the product prepared in Example 2 were heated to 60° C. together with 47.2 g of divinyltetramethyldisiloxane and 105.2 g of decamethylcyclopentasiloxane with addition of 0.25 g of trifluoromethanesulfonic acid (0.1 m % based on the overall mixture) in a 500 ml four-neck flask with precision glass stirrer and a reflux condenser on top for 6 hours, then 5 g of sodium hydrogencarbonate were added and the mixture was stirred for a further 30 minutes. With the aid of a filter press (Seitz K 300 filter disc), the salt was separated from the equilibrate.

The corresponding $^{29}$Si NMR spectrum confirms, as the target structure, a branched siloxane bearing terminal vinyl functions.

The invention claimed is:

1. A mixture of cyclic branched siloxanes having exclusively D and T units, wherein the cumulative proportion of the D and T units having Si-alkoxy and/or SiOH groups that are present in the siloxane matrix, determinable by $^{29}$Si NMR spectroscopy, is less than 2 mole percent based on the totality of silicon detected by spectroscopy, and further comprising at least 5% by weight of siloxane cycles selected from the group consisting of octamethylcyclotetrasiloxane ($D_4$), decamethylcyclopentasiloxane ($D_5$), dodecamethylcyclohexasiloxane ($D_6$) and mixtures thereof.

2. The mixture according to claim 1, wherein the branching T unit derives from alkyltrialkoxysilanes and/or phenyltrialkoxysilanes.

3. The mixture according to claim 1, wherein the branching T unit derives from methyltriethoxysilane.

4. A process for preparing siloxane mixtures according to claim 1, the process comprising
  (a) an acid-catalysed equilibration of trialkoxysilanes with siloxane cycles and/or α,ω-dihydroxypolydimethylsiloxane in the presence of at least one acidic catalyst and then
  (b) a hydrolysis and condensation reaction initiated by addition of water, followed by the addition of a silicon-containing solvent,
  (c) with a subsequent distillative removal of the alcohol released and proportions of the water present in the system,
  (d) with subsequent addition of toluene and separation of residual water remaining in the system,
  (e) followed by a neutralization or removal of the acidic catalyst and, removal of any salts formed,
  (f) with final distillative removal of toluene still present in the system,
wherein the silicon-containing solvent comprises the isomeric siloxane cycles octamethylcyclotetrasiloxane ($D_4$), decamethylcyclopentasiloxane ($D_5$) and/or mixtures thereof, and mass ratios of silicon-containing solvent to the siloxane having D and T units of 1:1 to 5:1 are advantageously employed.

5. The process according to claim 4, wherein the acidic catalyst is selected from the group consisting of para-toluenesulfonic acid, trifluoromethanesulfonic acid, trichloroacetic acid, sulfuric acid, perchloric acid, phosphoric acid and hexafluorophosphoric acid, in amounts of 0.1 to 2.0 percent by weight based in each case on the silicon-containing component of the reaction matrix.

6. The process according to claim 4, wherein the acidic catalyst used is a macrocrosslinked sulfonic acid ion exchange resin, preferably in amounts of 1.0 to 10.0 percent by weight based in each case on the silicon-containing component of the reaction matrix.

7. The process according to claim 4, wherein the reaction is conducted at temperatures in the range from 20° C. to 120° C.

8. The process according to claim 4, wherein an at least 100% $H_2O$ excess is used, based on the groups to be condensed.

9. The process according to claim 4, wherein the reaction comprises a preliminary equilibration step at temperatures of T>40° C., followed by a condensation initiated by addition of water at temperatures of T>60° C., where the water is added in one portion, in several portions or continuously.

10. A process for preparing branched organomodified siloxanes, wherein
in a first step mixtures of cyclic branched siloxanes are provided, according to claim 1,
and
in a second step the mixtures of cyclic branched siloxanes are acid-equilibrated with silanes and/or siloxanes.

11. A process according to claim 10, characterized in that the silanes and/or siloxanes used are acid-equilibratable silicon compounds,
wherein the silanes used are diethoxydimethylsilane, trimethylalkoxysilanes and/or dimethyldichlorosilane, and/or
wherein the siloxanes used are preferably tetramethyldisiloxane, α,ω-dihydropolydimethylsiloxanes, poly(methylhydro)siloxanes, α,ω-dialkoxypolydimethylsiloxanes and/or σ,ω-divinylpolydimethylsiloxanes.

12. A process according to claim 10, wherein, in the second step, the mixtures of cyclic branched siloxanes are equilibrated with silanes and/or siloxanes in the presence of an acidic catalyst, acid, in an amount of ≥0.1% by weight.

13. A process according to claim 10, wherein, in the second step in which the mixtures of cyclic branched siloxanes are acid-equilibrated with silanes and/or siloxanes, the equilibration is undertaken over a water-containing macroporous sulfonic acid polystyrene resin, which is used in amounts of 3% to 9% by weight and, which has been wetted with 8% to 12% by weight of water, and the specific surface area of which is ≥35 $m^2/g$ and the mean pore diameter of which is—preferably at least 65 nm.

14. The process according to claim 4, wherein the acidic catalyst is selected from the group consisting of para-toluenesulfonic acid, trifluoromethanesulfonic acid, trichloroacetic acid, sulfuric acid, perchloric acid, phosphoric acid and hexafluorophosphoric acid, in amounts of 0.15 to 1.0 percent by weigh based in each case on the silicon-containing component of the reaction matrix.

15. The process according to claim 4, wherein the acidic catalyst used is a macrocrosslinked sulfonic acid ion exchange resin, in amounts of 2.0 to 6.0 percent by weight based in each case on the silicon-containing component of the reaction matrix.

16. A process for preparing branched silicone oils, wherein in a first step cyclic branched siloxanes are provided, according to claim 1,
and in a second step the cyclic branched siloxanes are reacted with polydimethylsiloxanes or hexamethyldisiloxane.

17. A mixture of cyclic branched siloxanes having exclusively D and T units, wherein the cumulative proportion of the D and T units having Si-alkoxy and/or SiOH groups that are present in the siloxane matrix, determinable by $^{29}Si$ NMR spectroscopy, is less than 2 mole percent, and further comprising at least 5% by weight of siloxane cycles selected from the group consisting of octamethylcyclotetrasiloxane ($D_4$), decamethylcyclopentasiloxane ($D_5$), dodecamethylcyclohexasiloxane ($D_6$) and mixtures thereof wherein the ratio of D to T units is between 10:1 and 3:1.

18. The mixture according to claim 17, wherein the molar mass ratio of the mixture $M_w/M_n$ is in the range of $2<M_w/M_n<50$.

19. A starting material for production of stabilizers for PUR foams, for production of defoamers, the starting material comprising a mixture of branched organomodified siloxanes having exclusively D and T units, wherein the cumulative proportion of the D and T units having Si-alkoxy and/or SiOH groups that are present in the siloxane matrix, determinable by $^{29}Si$ NMR spectroscopy, is less than 2 mole percent, and further comprising at least 5% by weight of siloxane cycles selected from the group consisting of octamethylcyclotetrasiloxane ($D_4$), decamethylcyclopentasiloxane ($D_5$), dodecamethylcyclohexasiloxane ($D_6$) and mixtures thereof wherein
the mixtures of cyclic branched siloxanes are acid-equilibrated with silanes and/or siloxanes.

20. A mixture of cyclic branched siloxanes having exclusively D and T units, wherein the cumulative proportion of the D and T units having Si-alkoxy and/or SiOH groups that are present in the siloxane matrix, determinable by $^{29}Si$ NMR spectroscopy, is less than 2 mole percent, and further comprising at least 5% by weight of siloxane cycles selected from the group consisting of octamethylcyclotetrasiloxane ($D_4$), decamethylcyclopentasiloxane ($D_5$), dodecamethylcyclohexasiloxane ($D_6$) and mixtures thereof, wherein the ratio of D to T units is between 6:1 and 4:1.

* * * * *

UNITED STATES PATENT AND TRADEMARK OFFICE
CERTIFICATE OF CORRECTION

PATENT NO. : 10,766,913 B2
APPLICATION NO. : 16/140573
DATED : September 8, 2020
INVENTOR(S) : Wilfried Knott and Horst Dudzik It is certified that error appears in the above-identified patent and that said Letters Patent is hereby corrected as shown below:

In the Claims

Column 15,
Lines 40-41, Claim 11: "siloxanes used are preferably tetramethyldisiloxane" should read -- siloxanes used are tetramethyldisiloxane --.

Signed and Sealed this
Third Day of November, 2020

Andrei Iancu
*Director of the United States Patent and Trademark Office*